(12) United States Patent
Lim et al.

(10) Patent No.: US 11,444,278 B2
(45) Date of Patent: Sep. 13, 2022

(54) CATHODE MATERIAL FOR LITHIUM SECONDARY BATTERY, AND PREPARATION METHOD THEREFOR

(71) Applicant: LG CHEM, LTD., Seoul (KR)

(72) Inventors: Sung Chul Lim, Daejeon (KR); Jonghyun Chae, Daejeon (KR); Suhwan Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 74 days.

(21) Appl. No.: 16/766,488

(22) PCT Filed: Oct. 25, 2018

(86) PCT No.: PCT/KR2018/012757
§ 371 (c)(1),
(2) Date: May 22, 2020

(87) PCT Pub. No.: WO2019/103330
PCT Pub. Date: May 31, 2019

(65) Prior Publication Data
US 2020/0381716 A1 Dec. 3, 2020

(30) Foreign Application Priority Data

Nov. 24, 2017 (KR) .................. 10-2017-0158716

(51) Int. Cl.
*H01M 4/485* (2010.01)
*C01G 45/12* (2006.01)
(Continued)

(52) U.S. Cl.
CPC ........ *H01M 4/485* (2013.01); *C01G 45/1285* (2013.01); *H01M 10/0525* (2013.01);
(Continued)

(58) Field of Classification Search
CPC ............................... C01G 39/02; C01G 31/02
See application file for complete search history.

(56) References Cited

U.S. PATENT DOCUMENTS

| | | | |
|---|---|---|---|
| 5,427,763 | A | 6/1995 | Lawton et al. |
| 2002/0197533 | A1 | 12/2002 | Gao et al. |

(Continued)

FOREIGN PATENT DOCUMENTS

| | | |
|---|---|---|
| CN | 101481142 A | 7/2009 |
| CN | 103915610 A | 7/2014 |

(Continued)

OTHER PUBLICATIONS

Delmas et al. "Formation of the ω-type phase by lithium intercalation in (Mo, V) oxides deriving from V2O5" Journal of Power Sources, 1995, 54, 406-410. (Year: 1995).*

(Continued)

*Primary Examiner* — Peter F Godenschwager
(74) *Attorney, Agent, or Firm* — Birch, Stewart, Kolasch & Birch, LLP

(57) ABSTRACT

A positive electrode material for lithium secondary batteries capable of easily doping vanadium oxide with molybdenum, and a method of manufacturing the same are disclosed. The method of manufacturing a positive electrode material for lithium secondary batteries includes (a) reacting vanadium (Continued)

(A)

(B)

oxide with a water-soluble molybdenum-based compound in the presence of a solvent; and (b) thermally treating the reaction product of (a).

2 Claims, 2 Drawing Sheets

(51) Int. Cl.
  *H01M 10/0525* (2010.01)
  *H01M 4/02* (2006.01)
(52) U.S. Cl.
  CPC ...... *C01P 2002/72* (2013.01); *C01P 2002/76* (2013.01); *C01P 2002/77* (2013.01); *C01P 2002/78* (2013.01); *C01P 2004/50* (2013.01); *C01P 2006/40* (2013.01); *H01M 2004/028* (2013.01)

(56) References Cited

U.S. PATENT DOCUMENTS

| | | | | |
|---|---|---|---|---|
| 2007/0264573 A1* | 11/2007 | Yamada | ......... | C01G 51/42 429/231.1 |
| 2014/0193714 A1 | 7/2014 | Kim et al. | | |
| 2015/0364761 A1 | 12/2015 | Fukui et al. | | |

FOREIGN PATENT DOCUMENTS

| | | | |
|---|---|---|---|
| CN | 105024059 | A | 11/2015 |
| CN | 106532037 | A | 3/2017 |
| CN | 106611845 | A | 5/2017 |
| CN | 106784738 | A | 5/2017 |
| CN | 107069020 | A | 8/2017 |
| JP | 10-218621 | A | 8/1998 |
| JP | 11-79750 | A | 3/1999 |
| JP | 2004-330109 | A | 11/2004 |
| JP | 2015-85007 | A | 4/2015 |
| KR | 10-1998-050458 | A | 9/1998 |
| KR | 10-0233236 | B1 | 12/1999 |
| KR | 10-2014-0108605 | A | 9/2014 |
| WO | WO 2012/001636 | A1 | 1/2012 |
| WO | WO 2012/169274 | A1 | 12/2012 |
| WO | WO 2017/074124 | A1 | 5/2017 |

OTHER PUBLICATIONS

Zhang et al., "A New Type Carbon Composited Molybdenum Doped Vanadium Oxide Nanowires as A Cathode Material for Sodium Ion Batteries", Journal of Electrochemistry, vol. 23, No. 4, Aug. 2017, pp. 456-465, with English abstract (English abstract, see p. 465).
Extended European Search Report for European Application No. 18881810.8, dated Oct. 5, 2020.
Haaß et al."X-Ray absorption and X-ray diffraction studies on molybdenum doped vanadium pentoxide", Physical Chemistry Chemical Physics, vol. 5, No. 19, Jan. 1, 2003, pp. 4317-4324.
Jin et al. "Structural and electrochromic properties of molybdenum doped vanadium pentoxide thin films by sol-gel and hydrothermal synthesis", Thin Solid Films. vol. 517, No. 6, Jan. 30, 2009, pp. 2023-2028.
Zhao et al. "Facile Solution-Grown Mo-Doped Vanadium Dioxide Thermochromic Films with Decreased Phase Transition Temperature and Narrowed Hysteresis Loop Width", Materials Science Forum, vol. 787, Apr. 1, 2014, pp. 23-30.
Delmas et al., "The $Li_xV_2O_5$ system: An overview of the structure modifications induced by the lithium intercalation", Solid State Ionics, 1994, vol. 69, pp. 257-264.
Hanlon et al., "Molybdenum-doped vanadium dioxide coatings on glass produced by the aqueous sol-gel method", Thin Solid Films, 2003, vol. 436, pp. 269-272.
International Search Report for PCT/KR2018/012757 dated Feb. 1, 2019.
Kaveevivitchai et al.; "High Capacity Microporous Molybdenum-Vanadium Oxide Electrodes for Rechargeable Lithium Batteries", Chemistry of Materials, vol. 25, No. 13, pp. 2708-2715.
Li et al., "Evaluation of Mo-doped amorphous $V_2O_5$ films as a positive electrode for lithium batteries", Solid State Ionics, 2001, vol. 143, pp. 67-72.
Song et al., "Mo-doped $LiV_3O_8$ nanorod-assembled nanosheets as a high performance cathode material for lithium ion batteries", Journal of Materials Chemistry A, 2015, vol. 3, No. 7, pp. 3547-3558.
Cao et al. "Handbook of Synthesis of Inorganic Compounds" Chemical Industry Press, vol. 1, Oct. 31, 1983, p. 297 (5 pages total). With English translation.

* cited by examiner

【Figure 1】
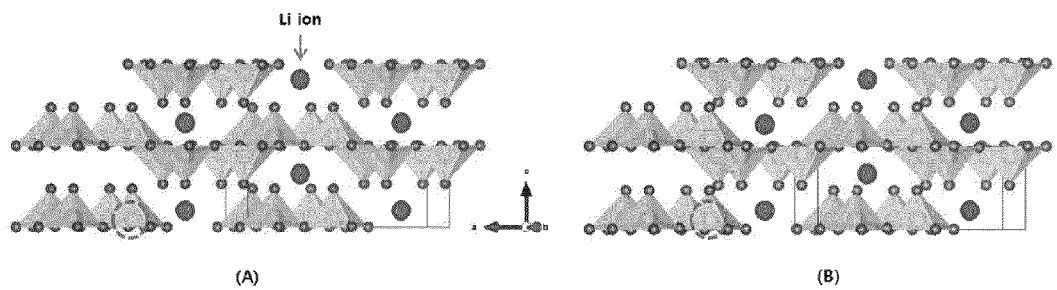
【Figure 2】
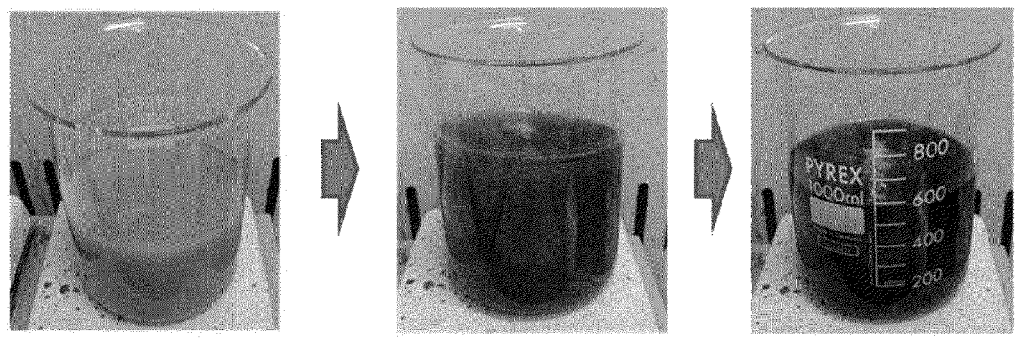
【Figure 3】
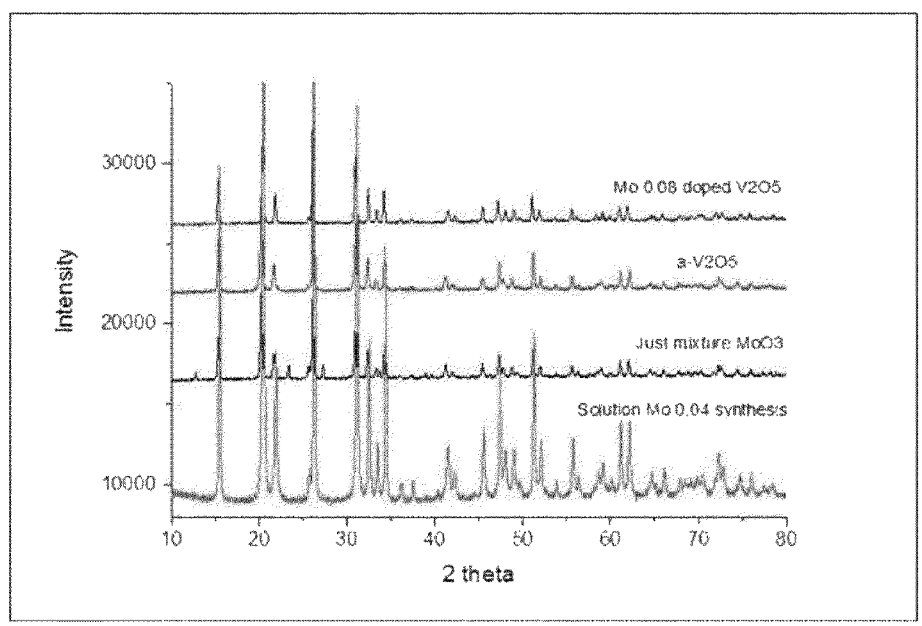

[Figure 4]
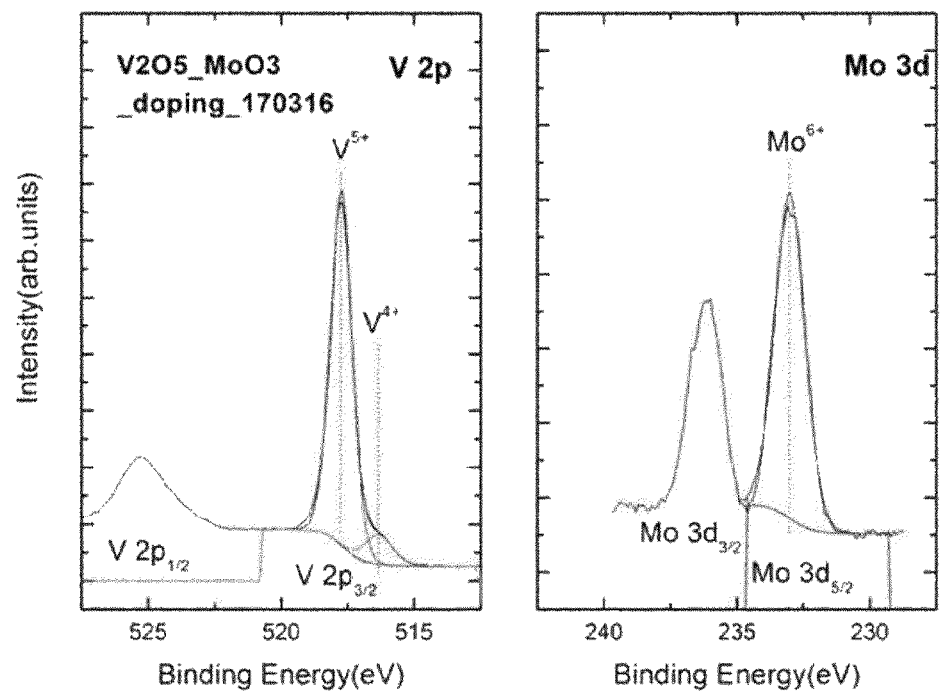

CATHODE MATERIAL FOR LITHIUM SECONDARY BATTERY, AND PREPARATION METHOD THEREFOR

TECHNICAL FIELD

This application claims the benefit of priority based on Korean Patent Application No. 10-2017-0158716, filed Nov. 24, 2017, and all the contents disclosed in the literatures of the corresponding Korea patent applications are included as a part of the present specification.

The present invention relates to a positive electrode material for lithium secondary batteries and a method of manufacturing the same, and more particularly to a positive electrode material for lithium secondary batteries capable of easily doping vanadium oxide with molybdenum, and a method of manufacturing the same.

BACKGROUND ART

With the growing technical development and demand for mobile devices, the demand for secondary batteries as energy sources is rapidly increasing. In recent years, the use of secondary batteries as power sources for electric vehicles (EVs), hybrid electric vehicles (HEVs), and the like has been realized. Accordingly, a lot of research on the secondary batteries capable of meeting various requirements has been conducted. In particular, the research on lithium secondary batteries having high properties such as energy density, discharge voltage, and output stability has been actively conducted due to their high demand.

With the recent remarkable development of lithium secondary batteries, the technology of the lithium secondary batteries has been applied to various fields. However, various batteries capable of overcoming the limitations of current lithium secondary batteries have been researched in terms of the battery capacity, safety, output, enlargement, microminiaturization, and the like. Typically, the continuous research on metal-air batteries having very higher theoretical capacity compared to the current lithium secondary batteries in terms of the capacity, all-solid batteries having no risk of explosion in terms of the safety, supercapacitors having superior output characteristics when compared to the lithium secondary batteries in terms of the output, sodium-sulfur (Na—S) batteries or redox flow batteries (RFBs) in terms of the enlargement, thin-film batteries in terms of the microminiaturization, and the like has been conducted in the academics and the industrial world.

In general, a lithium secondary battery uses metal oxides (such as $LiCoO_2$, etc.) as a positive electrode active material and a carbon material as a negative electrode active material, and is manufactured by interposing a polyolefin-based porous separator between a negative electrode and a positive electrode and impregnating a non-aqueous electrolyte solution containing lithium salts (such as $LiPF_6$, etc.). However, $LiCoO_2$ currently used as the positive electrode active material for the most common lithium secondary batteries has advantages in that it has a high operating voltage and a large capacity, but has various drawbacks in that it is relatively expensive due to the limitations of its resources, has a low charge/discharge current capacity of approximately 150 mAh/g, its crystal structure is unstable at a voltage of 4.3 V or more, and exhibits a risk of ignition through a reaction with an electrolyte solution. In addition, $LiCoO_2$ has a disadvantage in that huge changes in physical properties occur in response to changes in some parameters in a manufacturing process.

What is proposed as alternative to such $LiCoO_2$ is $LiMn_2O_4$. $LiMn_2O_4$ has lower capacity compared to the $LiCoO_2$, but has advantages in that it is inexpensive and has no pollution factors. Referring to the structure of $LiCoO_2$ and $LiMn_2O_4$ as representative examples of the positive electrode active material, $LiCoO_2$ has a layer structure, and $LiMn_2O_4$ has a spinel structure. The two materials commonly have excellent performance as batteries when the materials exhibit excellent crystallinity. Therefore, a thermal treatment process should be surely performed upon the manufacture of thin films or as a subsequent process in order to crystallize the two materials especially when thin film batteries are manufactured. Therefore, because the polymer material does not endure a thermal treatment temperature, it is impossible so far to form a battery on a polymer (for example, plastic) material for the medical and special purposes when the battery is manufactured using the two materials.

What is proposed to solve the drawbacks of the two materials is vanadium oxide. Vanadium oxide has low capacity, but has an advantage in that it has very excellent electrode characteristics even in an amorphous state. Also, the vanadium oxide has come into the spotlight since it is relatively easier to synthesize when compared to the two materials, and may be especially synthesized even at room temperature. The amorphous vanadium oxide synthesized at room temperature has superior performance (for example, lifespan or efficiency) over crystalline vanadium oxide. Accordingly, when the vanadium oxide is used as the positive electrode active material, a room-temperature process is possible, which makes it possible to manufacture a secondary battery on a polymer material such as plastics.

Although vanadium oxides such as $V_2O_5$, and the like have a low range of voltage, compared to lithium cobalt oxide (LCO) or lithium manganese oxide (LMO), the vanadium oxides have advantages in that they have a high theoretical capacity of 442 mAh/g, show cycle stability higher than LMO, and are easier to synthesize when compared to the LCO. For these reasons, the vanadium oxides prepared by various chemical methods and methods of synthesize a thin film at a high temperature under a vacuum are expected to have a very high probability to be applied as the positive electrode active material for secondary batteries in the future.

However, when the vanadium oxides are used as the positive electrode active material, the vanadium oxides have a drawback in that the charge/discharge capacities (C-rate capability), the output characteristics, and the lifespan performance of the batteries are not sufficient during the intercalation/deintercalation of lithium ions. As a plan to overcome this, there is an attempt to dope a vanadium oxide with a heterogeneous nuclide such as Mo, Mn, Co, and the like. In this case, the doping is unfortunately performed only by a solid-state vacuum polymerization method which includes mixing $MoO_3$ powder, which is used as a molybdenum source (a Mo source), with vanadium oxide at a proper molar mass ratio, and sealing the resulting mixture at a high temperature under a vacuum. Therefore, there is a demand for an improved positive electrode active material using the vanadium oxide, and a method of manufacturing the same, as known in the related art.

DISCLOSURE

Technical Problem

Therefore, an object of the present invention is to provide a positive electrode material for lithium secondary batteries capable of improving the charge/discharge capacity, the output characteristics, and the lifespan performance of a lithium secondary battery by doping a vanadium oxide with molybdenum.

Another object of the present invention is to provide a method of manufacturing a positive electrode material for lithium secondary batteries, which is capable of easily doping a vanadium oxide with molybdenum.

Technical Solution

To solve the above problems, according to one aspect of the present invention, there is provided a method of manufacturing a positive electrode material for lithium secondary batteries, which includes (a) reacting a vanadium oxide with a water-soluble molybdenum-based compound in the presence of a solvent; and (b) thermally treating the reaction product.

According to another aspect of the present invention, there is provided a positive electrode material for lithium secondary batteries manufactured by the method, wherein the positive electrode material for lithium secondary batteries includes a positive electrode active material of the following Formula 1 in which a portion of any one vanadium atom in a vanadium oxide is doped (substituted) with molybdenum, and wherein respective crystal space groups of the vanadium oxide prior to the molybdenum doping and the positive electrode active material represented by the following Formula 1 are identical as Pmmn in the orthorhombic crystal system, and a structure of the positive electrode active material represented by the following Formula 1 is maintained even when lithium ions are intercalated/deintercalated to/from the positive electrode active material.

$$V_{2-x}Mo_xO_5 \quad \text{[Formula 1]}$$

wherein x is in a range of 0.01 to 0.09.

Advantageous Effects

The positive electrode material for lithium secondary batteries according to the present invention and the method of manufacturing the same has an advantage in that it can improve the charge/discharge capacity, the output characteristics, and the lifespan performance of the lithium secondary battery by doping a vanadium oxide with molybdenum.

DESCRIPTION OF DRAWINGS

FIG. 1 is a diagram showing (A) a structure of vanadium pentoxide ($V_2O_5$) before the structure of vanadium pentoxide ($V_2O_5$) is substituted with molybdenum and (B) a structure of vanadium pentoxide ($V_2O_5$) after the structure of vanadium pentoxide ($V_2O_5$) is substituted with molybdenum according to one exemplary embodiment of the present invention.

FIG. 2 is an image for illustrating the solubility and color change of a positive electrode active material with time according to one exemplary embodiment of the present invention.

FIG. 3 is an XRD analysis graph of positive electrode active materials manufactured in one example of the present invention and comparative examples.

FIG. 4 shows the data of confirming that a vanadium oxide is doped with molybdenum.

BEST MODE

Hereinafter, the present invention will be described in detail.

A positive electrode material for lithium secondary batteries according to the present invention is characterized in that the positive electrode material for lithium secondary batteries is manufactured by a method of manufacturing a positive electrode material for lithium secondary batteries as will be described below, wherein the positive electrode material for lithium secondary batteries includes a positive electrode active material of the following Formula 1 in which a portion of any one vanadium atom in a vanadium oxide is doped (substituted) with molybdenum, and wherein respective crystal space groups of the vanadium oxide prior to the molybdenum doping and the positive electrode active material represented by the following Formula 1 are identical as Pmmn in the orthorhombic crystal system, and a structure of the positive electrode active material represented by the following Formula 1 is maintained even when lithium ions are intercalated/deintercalated to/from the positive electrode active material.

$$V_{2-x}Mo_xO_5 \quad \text{[Formula 1]}$$

wherein x is in a range of 0.01 to 0.09, preferably greater than 0.01 and less than 0.09.

Vanadium oxides (vanadates) have very excellent electrode characteristics even in an amorphous state (particularly, vanadium pentoxide ($V_2O_5$) is suitably used as an electrode material because it has a theoretically high specific capacity), and may be synthesized at a room temperature as well. Therefore, the vanadium oxides have come into the spotlight as positive electrode materials for next-generation lithium secondary batteries. However, when the vanadium oxides are used as the positive electrode material, a structural change is caused during the intercalation/deintercalation of lithium ions, resulting in degraded charge/discharge capacities (C-rate capability), output characteristics, and lifespan performance of batteries. Also, the vanadium oxides have drawbacks in that the vanadium oxides have poor electric conductivity and a low ion diffusion coefficient, and vanadium is eluted into an electrolyte solution, resulting in a collapsed electrode structure.

To solve the above problems, according to the present invention, some vanadium atoms in a vanadium oxide are doped or substituted with molybdenum. Like vanadium, molybdenum belongs to transition metals, and may be substituted with vanadium in various types of vanadium oxides in that it has various oxidation numbers upon its oxidation. Also, molybdenum has an ion radius similar to vanadium, and thus has an advantage in that a structure of an oxide is hardly changed even when some of vanadium atoms are substituted with molybdenum.

FIG. 1 is a diagram showing (A) a structure of vanadium pentoxide ($V_2O_5$) before the structure of vanadium pentoxide ($V_2O_5$) is substituted with molybdenum and (B) a structure of vanadium pentoxide ($V_2O_5$) after the structure of vanadium pentoxide ($V_2O_5$) is substituted with molybdenum according to one exemplary embodiment of the present invention. As shown in FIG. 1, lithium ions may be intercalated/deintercalated between vanadium oxides having a bipyramidal shape. Therefore, there is hardly a change in structure of an oxide regardless of the substitution with molybdenum, and a distance between oxygen and a transition metal is shortened due to the substitution with molybdenum. As a result, a transfer pathway of lithium ions is secured, resulting in a rapid change in diffusion coefficient value of the lithium ions. As a result, the charge/discharge capacity and output characteristics of batteries may be improved. When a position of vanadium is substituted with molybdenum, a change in oxidation number of the active material sequentially or simultaneously occurs in vanadium and molybdenum during the intercalation/deintercalation of lithium ions. Therefore, a structural effect of repeated intercalation/deintercalation of lithium ions on the vanadium oxide may be lowered due to the presence of molybdenum. Also, because the strong attraction between molybdenum and oxygen increases oxygen formation energy, the substitution with molybdenum may stabilize the structure even in a high potential region and improve the output characteristics.

Meanwhile, because vanadium serving as a transition metal may have various oxidation numbers, vanadium oxides having various ratios of vanadium and oxygen exist. Such vanadium oxides may be compounds containing vanadium atoms and oxygen atoms, such as a compound represented by the following Formula 2, a compound such as ammonium metavanadate ($NH_4VO_3$) as their source of manufacture, and the like.

$$V_aO_b \quad \text{[Formula 2]}$$

wherein $1 \leq a \leq 6$, and $2 \leq b \leq 13$.

As such, types of vanadium oxides used as the positive electrode material, particularly a positive electrode active material are not limited thereto. In this case, vanadium pentoxide ($V_2O_5$) may be preferred in consideration of the structural stability, and the vanadium pentoxide ($V_2O_5$) is a bipyramidal orthorhombic crystal system that has a structure with Pmmn space groups.

The positive electrode active material has 0.5 to 4.5%, preferably 1 to 4%, and more preferably 2 to 3.5% of vanadium substituted with molybdenum, based on the atom number of vanadium. When less than 0.5% of vanadium is substituted with molybdenum, an effect of suppressing the elution of vanadium may be insufficient due to the substitution with molybdenum. On the other hand, when greater than 4.5% of vanadium is substituted with molybdenum, an effect of improving the charge/discharge capacity and output characteristics may also be insufficient. The vanadium oxide substituted with molybdenum according to the present invention may have lattice parameters: a=11.51 Å, b=3.57 Å, and c=4.38 Å. Also, the vanadium oxide substituted with molybdenum according to the present invention or the positive electrode active material represented by Formula 1 has molybdenum and vanadium disposed on the same Wyckoff position 4f.

As the vanadium oxide substituted with molybdenum, the positive electrode active material may be included in the positive electrode material at a content of 50 to 90 parts by weight, preferably 60 to 80 parts by weight, based on a total of 100 parts by weight of the positive electrode material. When the content of the positive electrode active material is less than 50 parts by weight, based on a total of 100 parts by weight of the positive electrode material, electrochemical characteristics of batteries may be degraded due to the positive electrode active material. On the other hand, when the content of the positive electrode active material is greater than 90 parts by weight, additional components such as a binder and a conductive material may be included at very small quantities, which makes it difficult to efficiently manufacture batteries.

The vanadium oxide substituted with molybdenum is a positive electrode active material that may be applied to a positive electrode material for lithium secondary batteries. In addition to the positive electrode active material as the vanadium oxide substituted with molybdenum, the positive electrode material for lithium secondary batteries further includes a binder and a conductive material.

The binder included in the positive electrode material is a component that aids in binding a conductive material, etc. to the positive electrode active material and binding to a current collector. For example, the binder that may be used herein includes one or more selected from the group consisting of polyvinylidene fluoride (PVdF), a polyvinylidene fluoride-polyhexafluoropropylene copolymer (PVdF/HFP), polyvinyl acetate, polyvinyl alcohol, polyvinyl ether, polyethylene, polyethylene oxide, alkylated polyethylene oxide, polypropylene, polymethyl(meth)acrylate, polyethyl(meth)acrylate, polytetrafluoroethylene (PTFE), polyvinyl chloride, polyacrylonitrile, polyvinylpyridine, polyvinylpyrrolidone, a styrene-butadiene rubber, an acrylonitrile-butadiene rubber, an ethylene-propylene-diene monomer (EPDM) rubber, a sulfonated EPDM rubber, a styrene-butylene rubber, a fluorinated rubber, carboxymethylcellulose (CMC), starch, hydroxypropylcellulose, regenerated cellulose, and a mixture thereof, but the present invention is not particularly limited thereto.

The binder is typically added at a content of 1 to 50 parts by weight, preferably 3 to 15 parts by weight, based on a total of 100 parts by weight of the positive electrode material including the positive electrode active material. When the content of the binder is less than 1 part by weight, an adhesive strength of the positive electrode active material to the current collector may be insufficient. On the other hand, when the content of the binder is greater than 50 parts by weight, the adhesive strength is improved, but a decrease in content of the positive electrode active material is caused accordingly, resulting in degraded battery capacity.

The conductive material included in the positive electrode material is not particularly limited as long as the conductive material has excellent electric conductivity without causing side reactions in an internal environment of the lithium secondary battery and causing a chemical change in the corresponding battery. Typically, graphite or conductive carbon may be used. For example, graphites such as natural graphite, artificial graphite, and the like; carbon blacks such as carbon black, acetylene black, Ketjen black, denka black, thermal black, channel black, furnace black, lamp black, thermal black, and the like; carbon-based materials such as grapheme or graphite having a crystal structure; conductive fibers such as carbon fibers, metal fibers, and the like; fluorinated carbon; metal powders such as aluminum, nickel powder, and the like; conductive whiskeys such as zinc oxide, potassium titanate, and the like; conductive oxides such as titanium oxide, and the like; and conductive polymers such as polyphenylene derivatives, and the like may be used alone or in combination of two or more types, but the present invention is not particularly limited thereto.

The conductive material is typically added at a content of 0.5 to 50 parts by weight, preferably 1 to 30 parts by weight, based on a total of 100 parts by weight of the positive electrode material including the positive electrode active material. When the content of the conductive material is present at a very low content of less than 0.5 parts by weight, it is difficult to expect an effect of improving the electric conductivity, or the electrochemical characteristics of batteries may be degraded. When the content of the conductive material is present at a very high content of greater than 50 parts by weight, the capacity and energy density maybe lowered due to a relative decrease in amount of the positive electrode active material. A method of including the conductive material in the positive electrode material is not particularly limited. In this case, conventional methods known in the related art, including coating of the positive electrode active material, may be used. When necessary, a second coating layer may also be added to the positive electrode active material, and thus the addition of the conductive material as described above may be dispensed with.

As a component for suppressing the expansion of a positive electrode, a filler may be optionally added to the positive electrode material constituting the positive electrode according to the present invention. Such a filler is not particularly limited as long as the filler may suppress the expansion of the electrode without causing a chemical change in the corresponding battery. For example, olefin-based polymers such as polyethylene, polypropylene, and the like; fibrous materials such as glass fibers, carbon fibers, and the like may be used.

The positive electrode material including the positive electrode active material, the binder, and the conductive material may be dispersed in a dispersion medium (a solvent), and mixed to prepare a slurry, and a positive electrode current collector may then be coated with the slurry, dried, and rolled to manufacture the positive electrode of the present invention. N-methyl-2-pyrrolidone (NMP), dimethyl formamide (DMF), dimethyl sulfoxide (DMSO), ethanol, isopropanol, water, and a mixture thereof may be used as the dispersion medium (solvent), but the present invention is not particularly limited thereto.

Platinum (Pt), gold (Au), palladium (Pd), iridium (Ir), silver (Ag), ruthenium (Ru), nickel (Ni), stainless steel (STS), aluminum (Al), molybdenum (Mo), chromium (Cr), carbon (C), titanium (Ti), tungsten (W), In-doped $SnO_2$ (ITO), F-doped $SnO_2$ (FTO), and alloys thereof; and alloys obtained by treating a surface of aluminum (Al) or stainless steel with carbon (C), nickel (Ni), titanium (Ti) or silver (Ag) may be used as the positive electrode current collector, but the present invention is not particularly limited thereto. The positive electrode current collector may be in the form of foil, a film, a sheet, a punch, a porous body, a foaming body, and the like.

Also, the present invention provides a lithium secondary battery including the positive electrode according to the disclosure. In general, the lithium secondary battery includes a positive electrode composed of a positive electrode material and a current collector, a negative electrode composed of a negative electrode material and a current collector, and a separator blocking an electrical contact between the positive electrode and the negative electrode and allowing the movement of lithium ions. Also, the lithium secondary battery includes an electrolyte solution impregnated into the positive electrode, the negative electrode and the separator to allow the conduction of lithium ions. The negative electrode may be manufactured according to conventional methods known in the related art. For example, the negative electrode may be manufactured by dispersing and mixing a negative electrode active material, a conductive material, a binder, and optionally a filler in a dispersion medium (a solvent) to prepare a slurry, and coating a negative electrode current collector with the slurry, drying the negative electrode current collector, and rolling the dried negative electrode current collector.

A lithium metal or a lithium alloy (for example, an alloy of lithium with a metal such as aluminum, zinc, bismuth, cadmium, antimony, silicon, lead, tin, gallium, or indium) may be used as the negative electrode active material. Platinum (Pt), gold (Au), palladium (Pd), iridium (Ir), silver (Ag), ruthenium (Ru), nickel (Ni), stainless steel (STS), copper (Cu), molybdenum (Mo), chromium (Cr), carbon (C), titanium (Ti), tungsten (W), In-doped $SnO_2$ (ITO), F-doped $SnO_2$ (FTO), and alloys thereof; and alloys obtained by treating a surface of copper (Cu) or stainless steel with carbon (C), nickel (Ni), titanium (Ti), or silver (Ag) may be used as the negative electrode current collector, but the present invention is not particularly limited thereto. The negative electrode current collector may be in the form of foil, a film, a sheet, a punch, a porous body, a foam, and the like.

The separator is interposed between the positive electrode and the negative electrode and thus serves to prevent short circuitry between the positive electrode and the negative electrode and provide a channel of lithium ions. The separator may be used in the form of olefin-based polymers such as polyethylene, polypropylene, and the like; sheets such as glass fibers, and the like; multilayer films; microporous films, fabrics, and non-woven fabrics, but the present invention is not particularly limited thereto. Meanwhile, when a solid electrolyte (for example, an organic solid electrolyte, an inorganic solid electrolyte, etc.) such as a polymer is used as the electrolyte, the solid electrolyte may also serve as the separator. Specifically, an insulating thin film having high ion permeability and mechanical strength is used. A pore diameter of the separator may be generally in a range of 0.01 to 10 µm, and a thickness of the separator may be generally in a range of 5 to 300 µm.

A non-aqueous electrolyte solution (i.e., a non-aqueous organic solvent) may be used as the electrolyte solution. In this case, a carbonate, an ester, an ether, or a ketone may be used alone or in combination of two or more types, but the present invention is not particularly limited thereto. For example, aprotic organic solvents such as dimethyl carbonate, diethyl carbonate, dipropyl carbonate, methylpropyl carbonate, ethylpropyl carbonate, methylethyl carbonate, ethylene carbonate, propylene carbonate, butylene carbonate, γ-butyrolactone, n-methyl acetate, n-ethyl acetate, n-propyl acetate, phosphate triester, dibutyl ether, N-methyl-2-pyrrolidinone, 1,2-dimethoxy ethane, tetrahydrofuran, tetrahydrofuran derivatives (such as 2-methyl tetrahydrofuran), dimethyl sulfoxide, formamide, dimethyl formamide, dioxolane and derivatives thereof, acetonitrile, nitromethane, methyl formate, methyl acetate, trimethoxy methane, sulfolane, methyl sulfolane, 1,3-dimethyl-2-imidazolidinone, methyl propionate, ethyl propionate, and the like may be used, but the present invention is not particularly limited thereto.

A lithium salt may be further added to the electrolyte solution, which may then be used (so-called a lithium salt-containing non-aqueous electrolyte solution). In this case, the lithium salt may include known lithium salts easily dissolved in the non-aqueous electrolyte solution, for example LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiPF_3(CF_2CF_3)_3$, $LiAlCl_4$, $CH_3SO_3Li$, $CF_3SO_3Li$, $(CF_3SO_2)_2NLi$, chloroborane lithium, lower aliphatic lithium carbonate, lithium tetraphenylborate, lithium imide, and the like, but the present invention is not particularly limited thereto. To improve the charge/discharge characteristics, flame retardancy, and the like, for example, pyridine, triethylphosphite, triethanolamine, cyclic ether, ethylenediamine, n-glyme, hexamethyl phosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may also be added to the (non-aqueous) electrolyte solution. When necessary, the (non-aqueous) electrolyte solution may further include a halogen-containing solvent such as carbon tetrachloride, ethylene trifluoride, or the like in order to impart incombustibility. Also, the (non-aqueous) electrolyte solution may further include a carbon dioxide gas in order to improve high-temperature storage characteristics.

The lithium secondary battery of the present invention may be manufactured according to conventional methods known in the related art. For example, the lithium secondary battery may be manufactured by interposing a porous separator between a positive electrode and a negative electrode and introducing a non-aqueous electrolyte solution. The lithium secondary battery according to the present invention may show improved capacity characteristics (prevent a sudden drop in capacity) under a high-speed charge/discharge cycle condition, and may also have excellent cycle characteristics, rate characteristics, and lifespan characteristics. Therefore, the lithium secondary battery may be applied to a battery cell used as a power source for small devices, and may also be particularly properly used as a unit battery for battery modules which is a power source for medium and large devices. In this regard, the present invention also provides a battery module including two or more of the lithium secondary batteries which are electrically connected (in series or parallel). The number of the lithium secondary batteries included in the battery module may be variously adjusted in consideration of the use and capacity of the battery module, and the like.

In addition, the present invention provides a battery pack to which the battery module is electrically connected according to conventional techniques known in the related art. One or more selected from device power sources such as power tools; electric cars including electric vehicles (EVs), hybrid electric vehicles (HEVs), and plug-in hybrid electric vehicles (PHEVs); electric trucks; electric commercial vehicles; or power storage systems may be used as the battery module and the battery pack, but the present invention is not particularly limited thereto.

Next, the method of manufacturing a positive electrode material for lithium secondary batteries according to the present invention will be described. The method of manufacturing a positive electrode material for lithium secondary batteries includes (a) reacting a vanadium oxide with a water-soluble molybdenum-based compound in the presence of a solvent, and (b) thermally treating the reaction product of (a).

When such a method is used, the doping (substitution) with molybdenum in the vanadium oxide may be simply performed in a less dangerous manner, unlike the difficult, complicated and dangerous solid-state vacuum polymerization method which includes mixing $MoO_3$ powder, which is used as a molybdenum source (a Mo source), with a vanadium oxide at a proper molar mass ratio, and sealing the resulting mixture at a high temperature under a vacuum.

The molybdenum-based compound is a water-soluble molybdenum-containing compound that is easily dissolved in a solvent, particularly in water (such as distilled water), and may be used without particular limitation as long as it is allowed to easily and rapidly prepare a vanadium oxide substituted with molybdenum even when it reacts with (is mixed with and dissolved in) any types of vanadium oxides. Examples of such a molybdenum-based compound may include ammonium molybdate tetrahydroxides, for instance, $(NH_4)_6Mo_7O_{24} \cdot 4H_2O$ and the like.

In step (a), the molybdenum-based compound and the vanadium oxide may be added to a solvent at the weight ratio of 0.5 to 1.5:12 to 38. Meanwhile, a conventional organic acid such as citric acid, oxalic acid, tannic acid, and a mixture thereof may be further added in step (a), when necessary. In this case, the molybdenum-based compound, the vanadium oxide and the organic acid may be added to the solvent at a weight ratio of 0.5 to 1.5:12 to 38:17 to 53.

Also, the reaction in step (a) may be carried out using conventional agitation methods such as stirring, and the like, and examples of the solvent may include water (distilled water), solvents allowing a reaction of the vanadium oxide with the molybdenum-based compound, and the like. Meanwhile, a process of spraying the reaction product of the molybdenum-based compound and the vanadium oxide may be added between steps (a) and (b) in order to reduce a primary particle size of the vanadium oxide and form secondary particles in the form of balls in which primary particles are coagulated.

Step (b) is a process of thermally treating the reaction product of the molybdenum-based compound and the vanadium oxide at a temperature of 350 to 700° C., preferably 400 to 650° C. for 3 to 10 hours, preferably 4 to 7 hours, particularly a process of removing oxides which may remain in the powder. In this case, step (b) may be carried out using conventional heating devices (such as a furnace) or methods. In this case, when the heating temperature is greater than this temperature range, it is difficult to uniformly maintain a structure of the vanadium oxide due to oxidation and thermal deformation. Also, when the heating time is greater than this time range, a lithium (Li) ion diffusion pathway in the crystal structure may be lengthened to form an inefficient structure for the intercalation/deintercalation of lithium ions. Meanwhile, the description of the molybdenum-based compound and the vanadium oxide follows the detailed description as described above.

MODE FOR INVENTION

Hereinafter, preferred embodiments of the present invention are provided to aid in understanding the present invention. However, it should be understood that the detailed description disclosed herein is given by way of illustration of the present invention only, and thus various changes and modification may be made without departing from the sprite and scope of the present invention. Also, it will be apparent that such changes and modifications fall within the appended claims.

Example 1

Manufacture of Positive Electrode Active Material

First of all, 0.3960 g of a water-soluble molybdenum-based compound ($(NH_4)_6Mo_7O_{24} \cdot 4H_2O$), and 10 g of vanadium oxide ($V_2O_5$) was added to 500 mL of distilled water, and reacted at a temperature of 80° C. Thereafter, the reaction product was put into a heating furnace at 400° C., and thermally treated for 5.5 hours to manufacture a positive electrode active material including a vanadium oxide ($V_{1.96}Mo_{0.04}O_5$) substituted with molybdenum.

Manufacture of Positive Electrode for Lithium Secondary Batteries

The manufactured positive electrode active material, a binder including polyvinylidene fluoride (PVdF), and a conductive material including Super P were mixed at a weight ratio of 8:1:1 to manufacture a positive electrode material. Thereafter, the positive electrode material was dispersed in an NMP solvent, and an aluminum current collector was coated with the positive electrode material to a thickness of approximately 500 μm. After the coating, the aluminum current collector was dried for approximately 13 hours in a vacuum oven at approximately 120° C. to manufacture a positive electrode.

Manufacture of Lithium Secondary Battery

The manufactured positive electrode was disposed to face a negative electrode, and a polyethylene separator was then interposed between the positive electrode and the lithium negative electrode. Thereafter, an electrolyte solution in which LiFSI was dissolved in a dimethylether solvent at a concentration of 4 M was injected into a case to manufacture a coin cell.

Example 2

A positive electrode active material, a positive electrode, and a coin cell (a lithium secondary battery) were sequentially manufactured in the same manner as in Example 1, except that, in addition to 0.3960 g of the water-soluble molybdenum-based compound ($(NH_4)_6Mo_7O_{24} \cdot 4H_2O$) and 10 g of the vanadium oxide ($V_2O_5$), 14.03 g of oxalic acid was further added to 500 mL of distilled water.

Comparative Example 1

A positive electrode and a coin cell (a lithium secondary battery) were sequentially manufactured in the same manner as in Example 1, except that a positive electrode active material obtained by simply mixing molybdenum oxide ($MoO_3$) and vanadium oxide ($V_2O_5$) was used.

Comparative Example 2

A positive electrode and a coin cell (a lithium secondary battery) were sequentially manufactured in the same manner as in Example 1, except that vanadium oxide ($V_2O_5$) which was not substituted with molybdenum was used as the positive electrode active material.

Comparative Example 3

Molybdenum oxide ($MoO_3$) and powdery vanadium oxide ($V_2O_5$) was mixed at a molar weight ratio of 1:15, and the resulting mixture was pelletized, and put into a fused silica tube. Thereafter, the fused silica tube was vacuum-sealed, and thermally treated in a heating furnace at 650° C. to manufacture a positive electrode active material including a vanadium oxide ($V_{1.92}Mo_{0.08}O_5$) substituted with molybdenum. Then, a positive electrode and a coin cell (a lithium secondary battery) were sequentially manufactured in the same manner as in Example 1.

Experimental Example 1: Evaluation of Reaction of Positive Electrode Active Raw Material FIG. 2 is an image for illustrating the solubility and color change of the positive electrode active material with time according to one exemplary embodiment of the present invention. Specifically, this is related to the positive electrode active material manufactured in Example 1. As shown in FIG. 2, it can be seen that the vanadium oxide was properly reacted with the molybdenum-based compound.

Experimental Example 2: XRD Analysis

FIG. 3 is an XRD analysis graph of the positive electrode active materials manufactured in one example of the present invention and comparative examples. Here, 'Solution Mo 0.04 synthesis' represents Example 1, 'Just mixture $MoO_3$' represents Comparative Example 1, 'a-$V_2O_5$' represents Comparative Example 2, and 'Mo 0.08 doped $V_2O_5$' represents Comparative Example 3. The positive electrode active materials manufactured in Example 1 and Comparative Examples 1 to 3 were subjected to XRD analyses. As a result, it can be seen that only the positive electrode active material manufactured in Example in which the vanadium oxide was doped with molybdenum by means of solution polymerization, as shown in FIG. 3. Also, it was confirmed that the positive electrode active material of Example 1 had peaks similar to that of Comparative Example 3 in which the vanadium oxide was doped with molybdenum by means of solid-state vacuum polymerization. From these facts, it can be seen that the present invention using the solution polymerization is very efficient and stable unique technology which shows very similar results compared to those of the solid-state vacuum polymerization although the difficult, complicated and dangerous solid-state vacuum polymerization method involving the sealing at a high temperature under a vacuum was not used.

Experimental Example 3: Confirmation of Molybdenum Doping

FIG. 4 shows the data of confirming that a vanadium oxide is doped with molybdenum. Specifically, this is related to the positive electrode active material manufactured in Example 1. As shown in FIG. 4, it was confirmed that the oxidation number of vanadium was lowered from 5 to 4.9, and the oxidation number of molybdenum was 6. From these facts, it can be seen that some of vanadium atoms were substituted with molybdenum in the case of the positive electrode active material according to the present invention.

Meanwhile, the positive electrode active material of Example 2 was not shown in FIGS. 2 to 4, but was evaluated in Experimental Examples 1 to 3 in the same manner as in Example 1. As a result, it was confirmed that the results of evaluation were identical to those of Example 1.

The invention claimed is:

1. A method of manufacturing a positive electrode material for lithium secondary batteries, comprising:
   (a) reacting a vanadium oxide with a water-soluble molybdenum-based compound in the presence of a solvent; and
   (b) thermally treating the reaction product of (a), wherein:
   the molybdenum-based compound is ammonium molybdate tetrahydroxide of formula $(NH_4)_6Mo_7O_{24} \cdot 4H_2O$; and
   the vanadium oxide is a compound represented by the following Formula 2, or ammonium metavanadate of formula $NH_4VO_3$:

$$V_aO_b \qquad \text{[Formula 2]}$$

wherein $1 \leq a \leq 6$, and $2 \leq b \leq 13$,
   further comprising between steps (a) and (b), spraying the reaction product of the molybdenum-based compound and the vanadium oxide to reduce a primary particle size of the vanadium oxide and form secondary particles in which primary particles are coagulated.

2. The method of claim 1, wherein an organic acid selected from the group consisting of citric acid, oxalic acid, tannic acid, and a mixture thereof is further added in step (a).

* * * * *